United States Patent [19]
Marie et al.

[11] Patent Number: 5,278,592
[45] Date of Patent: * Jan. 11, 1994

[54] OPHTHALMIC LENS

[76] Inventors: Robert Marie, 4965 Roslyn, Montreal, Quebec, Canada, H3W 2Z5; Grant Gabrielian, 175 Deguire, Apt. 711, Ville St-Laurent, Quebec, Canada, H4N 1P1

[*] Notice: The portion of the term of this patent subsequent to Apr. 21, 2009 has been disclaimed.

[21] Appl. No.: 871,794

[22] Filed: Apr. 21, 1992

Related U.S. Application Data

[63] Continuation-in-part of Ser. No. 707,902, May 30, 1991, Pat. No. 5,106,180.

[51] Int. Cl.$^5$ .............................................. G02C 7/04
[52] U.S. Cl. .......................... 351/160 R; 351/160 H; 359/628
[58] Field of Search ...................... 351/161, 168–172; 351/160R, 160H, 162; 359/628

[56] References Cited

U.S. PATENT DOCUMENTS 4,898,461  2/1990  Portney .......................... 351/169
5,106,180  4/1992  Marie et al. .................... 351/161

FOREIGN PATENT DOCUMENTS 3246306  6/1984  Fed. Rep. of Germany .
1319800  12/1963  France .

Primary Examiner—Scott J. Sugarman
Attorney, Agent, or Firm—Foley & Lardner

[57] ABSTRACT

An ophthalmic lens has front and rear optical surfaces, a central optical axis substantially perpendicular to the lens and comprises a plurality of concentric, contiguous circular refractive bands provided on at least one of the front and rear optical surfaces. The bands have a continuous cross-section in the shape of a segment of an ellipse having a given major axis length and eccentricity. The bands are of a given optical power to focus light on the focal plane. The major or the minor axis of each ellipse segment intersects the central optical axis and the focal plane. The bands are continuous at their boundaries between neighboring ones of the bands. The entire optical surface of the lens may be used with minimal distortion caused by the intersections of the continuous bands.

3 Claims, 4 Drawing Sheets

OPHTHALMIC LENS

This application is a continuation-in-part application of Ser. No. 07 707,902 filed May 30, 1991, to be granted on Apr. 21, 1992 as U.S. Pat. No. 5,106,180.

BACKGROUND OF THE INVENTION

1. Field of the Invention

The present invention relates to a refractive ophthalmic lens having a reduced thickness, the lens having at least one of its surfaces formed with a number of concentric circular bands, the bands having an elliptical cross-section.

2. Description of the Prior Art

One form of multifocal ophthalmic lens is proposed in U.S. Pat. Nos. 4,210,391; 4,340,283 and 4,338,005 (Allen L. Cohen) whereby a multifocal Fresnel lens is constructed by means of modifying the phase separating annular rings of a zone plate, with curved or inclined optical facets of varying refractive indices which then function as Fresnel rings corresponding to the different focal powers desired. To counteract the inherent problems of a Fresnel lens with small annular zone widths where optical aberrations are introduced by diffraction effects, a zone plate is introduced. Thus, an ophthalmic lens according to the above patents would be a composite device comprised of a Fresnel lens and a zone plate.

A zone plate, essentially, is a diffraction optical device that consists of a series of concentric opaque rings of such predetermined width that rays from alternate half period elements are cut off. Such a device has some properties of a converging lens. Therefore, it has been attempted to use the combination of Fresnel lens and zone plate to approximate the function of a true refractive lens in either bifocal or multifocal configurations.

Anticipating the limitations presented by such a design, two of which are limited image brightness and limited dioptric power, another form of a multifocal ophthalmic lens has been proposed. Here the lens is also a composite device as described above except that a phase shift multifocal zone plate is constructed in such a way that some of the zone plate focii actually coincide with some of the multifocal Fresnel lens focii. This is obviously done to increase image brightness at each of the focii. An ophthalmic lens designed on this basis will present two major drawbacks, both of which cannot be circumvented due to the inherent optical properties of such a device.

The first drawback is the fundamental problem of inadequate image brightness typical to such designs, especially considering the wide range of focal points in such a lens. The other drawback is the limited range of focal lengths achievable with such a device.

Specifically, if a bifocal lens of a certain power is constructed, a very limited additional power for near vision can be provided. Whenever an appreciable additional power is required, the lens would be of very little value. The physical properties of light, such as wavelength and relative intensity, will fundamentally limit the performance of any multifocal ophthalmic lens, such as those proposed in U.S. Pat. Nos. 4,210,391; 4,340,283 and 4,338,005 mentioned earlier, especially when a small size is an absolute necessity, as is the case with contact or intraocular lenses.

It is paramount to keep in mind that any diffractive or composite diffractive lenses or devices are principally different from refractive lenses and only approximate a true refractive system.

Another type of an ophthalmic lens has been proposed in U.S. Pat. No. 4,418,991 (Joseph L. Breger). More specifically, a contact lens that would provide a distance correction at the center, while increasing the diopter adds away from the center would provide for intermediate and close viewing. (See Col. 5 lines 1 through 21 of Breger).

The dioptric power change in the above lens is achieved by progressively changing the radius of curvature of the posterior surface. A major limitation of such a lens is that the focal planes provided are not discrete but a progressive succession of innumerable possibilities, and therefore no truly sharp focal planes may be provided.

Another drawback is that the images produced will be located on substantially different areas of the retina which as is commonly known do not have the same sensitivity. Still another factor limiting the performance of such a lens will be its absolute dependence on the position relative to the pupil and the pupil size as well as its dilation. It is common knowledge that to achieve a continuously ideal position with a contact lens is not frequently possible. To control the pupil size or dilation relative to changing luminosity is even more difficult. It is important to note that lenses of progressive power change designs share common drawbacks and limitations regardless of whether the distance vision is in the center or toward the edges of the viewing area. Obviously the limiting factors are not equivalent but their presence severely curtails the performance of such or similar lenses in one way or another.

Still another design of a multifocal ophthalmic lens is proposed in French Pat. No. 1,319,800 by Sohnges. The lens in question would have discrete dioptric powers provided by concentric circular zones. The preferred version has the distance vision portion in the center of the lens and increasing dioptric power toward the periphery to provide intermediate and near vision. Although the formed images will be clearer than in progressive power increase or decrease designs, the performance of the lens in question will be limited due to a critical dependence on pupil size, centration of the lens relative to the pupil, ambient illumination as well as due to the creation of images on substantially different areas of the retina. Essentially the drawbacks of this design are similar to the ones in the progressive power change lenses differing mainly in the fact that the powers provided are discrete and not continuous.

Another form of an ophthalmic lens is described in WO88/09950 (Valdemar Portney). The proposed lens has a plurality of concentric alternating zones with a continuously varying power within each zone as well as in transition from one zone to another. In one version, continuous alternating power is accomplished by a continuously changing curvature of the posterior surface of the lens. In another version continuous, alternating power variation is accomplished by creating non-homogeneous surface characteristics having refractive material indices which continuously vary in the lens radial direction. In other words, the optical portion of such a lens is comprised of a number of concentric zones. The distinctive characteristic of this design (page 9, lines 2 through 5) is that each zone is considered to include a complete cycle of powers from intermediate to high to intermediate to low, then back to intermediate.

Still another type of multifocal ophthalmic lens is described in U.S. Pat. No. 4,798,608 (Dennis T. Grendahl). The invention pertains to an implantable intraocular lens containing a laminated structure comprising a number of laminated planar or curved elements. The incident rays are brought to a focus on a portion of the retina and are dependent on the number of lens elements traversed by a ray. Areas of differing powers are provided by forming a uniform lens surface over a composite laminated structure of laminate elements having different indices of refraction. Although the field of the invention claims to encompass contact lenses, producing a contact lens according to this invention would be highly impractical, given the physical structure of a contact lens. A typical thickness of an average rigid contact lens is about 0.12 mm across the cross section. Assuming only a three layer laminate structure according to the invention, to provide near, intermediate and distant vision, the curvatures in question relative to indices of refraction to provide dioptric requirements of a typical contact lens will render the center thickness of such a lens in the range of 1.00 to 1.30 mm, which is not practical.

A related invention is described in U.S. Pat. No. 4,795,462 (Dennis T. Grendahl). It pertains mostly to intraocular lenses but also covers contact and intracorneal lenses. A lens according to Grendahl contains annular elements each of which serves to bring the impinging rays from an object at a predetermined distance to a focus on a particular region of the retina. The lens is a composite of a cylindrical and annular optical lens elements each of which has a distinct power and focal length (see Col. 1, line 65 thereof). It differs from many other annular designs by the fact that it has a cylindrically segmented composite zone of focus.

A different multifocal lens design is proposed in U.S. Pat. No. 4,704,016 (John T. deCarle). A contact lens is described, wherein the major viewing area is divided into a number of near and distant vision zones. Of relevance to the present discussion is the case of a lens (see Col. 2, line 13), the front or the back surface of which is formed with a series of concentric areas, each annular area being cut alternately for distant and near vision. A lens produced according to that invention (see Col. 2, line 67 through Col. 3, line 16) will, as it is readily understood, have sharp steps at the lines of transition between annular areas. The magnitude of these steps for a typical contact lens would be in the order of 140 microns or 0.014 mm. This in itself will produce aberrations in the form of a multitude of prisms as well as diffractive effects. These combined (or even separately) will render the design disadvantageous. Therefore, a way of circumventing sharp steps is proposed (see Col. 3, line 4 through 16), whereby the center of curvature continually changes position relative to the central axis (which happens to be the optical axis as well) when moving the cutting tool to produce a profile which would have no sharp steps. In this case, annular rings of like power will have the same curvature but different centers both geometrically and optically. This means that each of these centers is located on a different optical axis. None of this multitude of optical axes coincide with the central principal optical axis of the lens (and the eye) except for the central zone axis and the zone immediately adjacent to it. Needless to say that a lens having a multitude of optical axes, once placed on an eye which has only one visual axis, will present a series of blurred images. This is of little value in view of the vision correction requirements.

A continuation of the above patent is U.S. Pat. No. 4,890,913. Here, as in the preceding case, a contact lens is formed, the viewing area of which is comprised of a plurality of annular viewing zones, each near vision zone being adjacent to a distant vision zone. The drawbacks of this lens will be exactly the same as in the preceding case, since it is essentially the same type of contact lens.

In retrospect, all of the relevant prior art examples have the common characteristic of circular (annular) concentric elements formed in the viewing area of the lens. All of them have drawbacks when considered in contact lens configuration.

One major common drawback of contact lenses of all types is a rapid increase in lens thickness with an increase in prescribed refractive power of a lens. This is true for both converging (positive) and diverging (negative) lenses. Obviously, depending on the refractive type of the lens the said increase in thickness manifests itself in different portions of the lens. Converging lenses exhibit the maximum thickness at the centre of the lens whereas diverging lenses exhibit an increase in thickness reaching a maximum at the outer periphery of the lens.

One traditional way of producing lenses of reduced thickness is lenticulation. Essentially, lenticulation is a method of reduction of lens thickness by confining the optical portion of the lens within a central area called the optical zone. This in effect reduces the diameter of the refractive element which therefore allows a reduction in thickness. The final diameter of the optical zone is dictated by the pupil diameter, lens position and displacement during blink cycle. The overall lens diameter is determined by the anatomical factors of the eye as well as by mechanical properties of the lens material and is greater than the optical zone. The area concentric to the said optical zone and extending to the overall lens diameter is called peripheral zone also referred to as lenticular carrier. This carrier is relatively thin when compared to the optical zone usually reaching minimum thickness at the edge of the lens.

There is, however, a requirement for a smooth junction between the optical zone and the peripheral zone. This requirement inevitably compromises the thickness of the said peripheral carrier such as in the case of diverging lenses where the junction between the optical and peripheral portions represents the thickest part of the lens.

SUMMARY OF THE INVENTION

An object of the present invention is to provide a refraction ophthalmic lens which is constructed in such a way that its position relative to the pupil is immaterial insofar as the dioptric power range and distribution is concerned.

Another object of the invention is to provide a refraction ophthalmic lens offering the full range of prescribed visual correction from anywhere on the viewing portion of the lens and permitting the ideal lens/cornea relationship to be respected.

A further object of this invention is to provide a refraction ophthalmic lens, wherein any area of significant size and/or location across the viewing portion of the lens is able to provide a complete range of prescribed dioptric powers.

A principal and paramount object of the invention is to provide a contact lens having concentric bands of a given dioptric power where the bands are described by elliptical curves, each of which is a segment of an ellipse of revolution, that is a solid generated by rotating an ellipse about the optical axis of the lens. The inclination of the major and minor axis of the ellipse relative to the optical axis of the lens, their positions relative to the optical axis and their individual eccentricities are to be calculated in a manner suitable to the context of the invention.

A further object of the invention is to provide a contact lens having concentric bands, the junctions of which are smooth and devoid of any sharp transitions or steps. More specifically, each transition will be a single point common to a pair of elliptical curves. The point in revolution of course becomes a single line of no practical width on the surface of the lens.

The principal object of the present invention is to provide an ophthalmic lens of minimum profile thickness.

Another object of the invention is to provide a refraction ophthalmic lens offering a prescribed visual correction from anywhere on the viewing portion of the lens and permitting the ideal lens/cornea relationship to be respected.

A further object of this invention is to provide a refraction ophthalmic lens, wherein any area of significant size and/or location across the viewing portion of the lens is able to provide the prescribed dioptric power.

A principal and paramount object of the invention is to provide a contact lens having concentric bands of identical dioptric power where the bands are described by elliptical curves, each of which is a segment of an ellipse of revolution, that is a solid generated by rotating an ellipse about the optical axis of the lens. The inclination of the major and the minor axis of the ellipses relative to the lens optical axis and their relative eccentricities are to be calculated in a manner suitable to the context of the invention.

A further object of the invention is to provide an ophthalmic lens having concentric bands, the junctions of which are smooth and devoid of any sharp transitions or steps. More specifically, each transition will be a single point common to a pair of elliptical curves. The point in revolution of course becomes a single line of no practical width on the surface of the lens.

According to the invention, there is provided an ophthalmic lens having front and rear optical surfaces and a central optical axis substantially perpendicular to the lens, the lens comprising a plurality of concentric, contiguous circular refractive bands provided on at least one of the front and rear optical surfaces, the bands each having a continuous cross-section in the shape of a segment of an ellipse having a given major axis lenghth and eccentricity, the bands being of the like optical power to focus light on a single focal plane to provide a prescribed vision correction, the bands being continuous at their boundaries between neighboring ones of the bands.

BRIEF DESCRIPTION OF THE DRAWINGS

The invention will now be better understood by way of the following description of a preferred embodiment with reference to the appended drawings in which.

DETAILED DESCRIPTION OF THE PREFERRED EMBODIMENT

Figure 1:
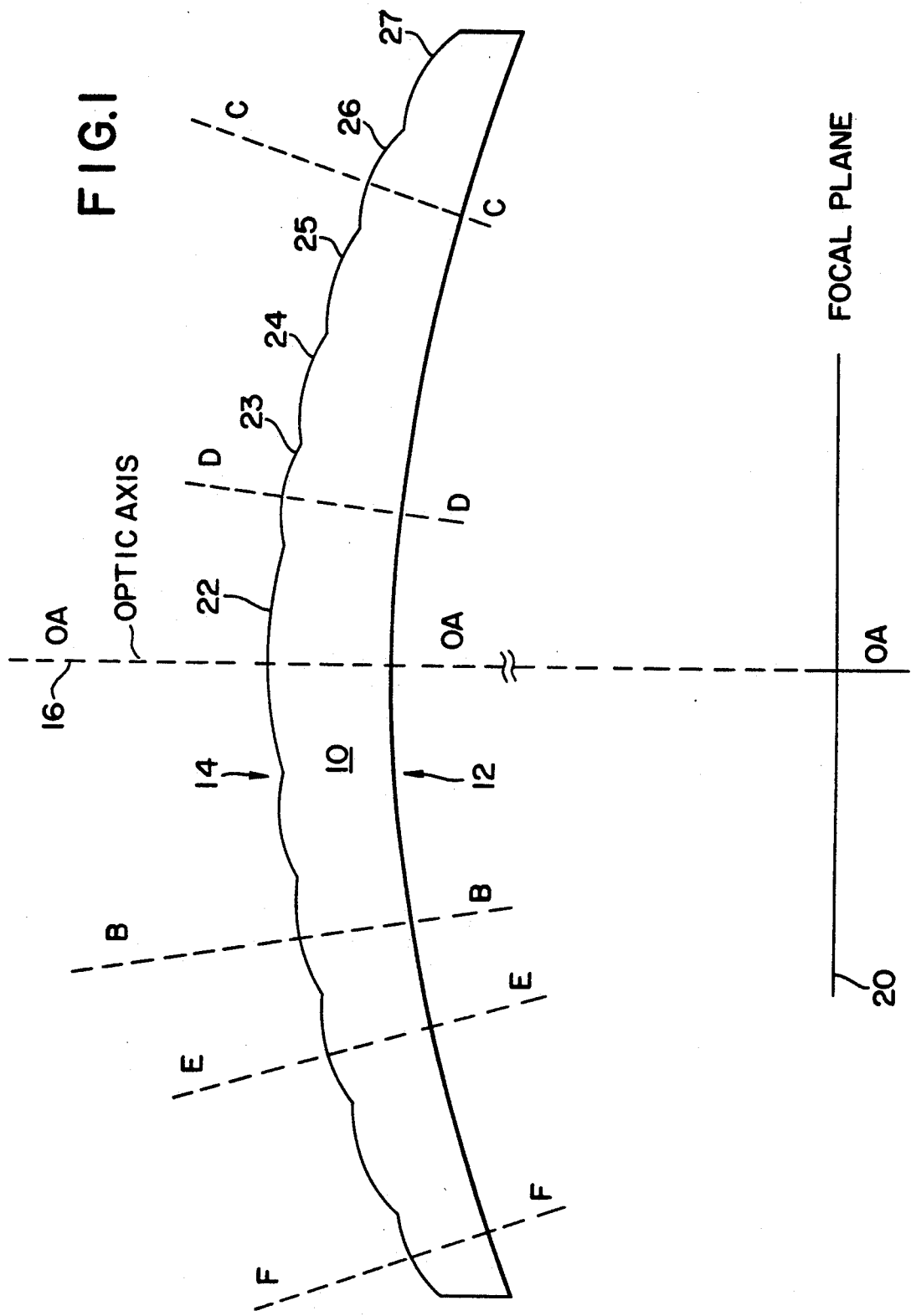
FIG. 1 shows a cross-section of a contact lens illustrating the preferred embodiment.

FIG. 1 shows the cross-section of a contact lens made according to the preferred embodiment of the invention, which is shown not to scale and with exaggerated formations in order to illustrate the invention. Lens (10) is made of conventional contact lens material and may be molded into its general shape and precision lathed on its front surface to provide the exact shape as required in accordance with the invention. Rear surface (12) of the lens is a continuous surface which may be shaped spherically or spheroidal in order to conform to the user's cornea (see U.S. Pat. No. 4,765,728 for a description of a spheroidally shaped rear contact lens surface).

Front surface (14) is provided with a number of concentric circular bands having identical dioptric powers. The series of bands is generated by revolving elliptical profiles (cross-sections) about axis (16) to form elliptical cross-section bands. The elliptical profiles used to generate the series of bands (22 to 27) are chosen to provide the prescribed dioptric power with the constriction that the point or points where elliptical bands join the neighboring bands match perfectly. Elliptical band (22) is an ellipse of revolution about optical axis (16) and does not form a ring like band but rather forms the central portion of the lens.

The elliptical bands (23 to 27) are formed by ellipses and have parameters which are chosen so that the boundaries of the elliptical bands (22 to 27) are continuous and also so that the optical focal point of the bands is on the optical axis (16) of the lens at the focal plane (20).

It is to be understood that the lens shown in FIG. 1 is of an exaggerated shape in order to illustrate the invention, and that the actual curvatures and other parameters are to be determined according to lens specifications as described below. The dioptric power D of a lens surface is given by $$D = \frac{n' - n}{R}$$

where n' is the refractive index of lens material, n is the refractive index of air (or other surrounding medium) and R is the radius of curvature of the surface.

In the case of an ellipse of revolution, the radius of curvature R is given by $R = f(1+e)$ where f is the distance between major axis vertex and the focus (the closer geometric focal point) and e is the eccentricity of the ellipse.

The dioptric power of a lens is given by the difference between the dioptric powers of its outer and inner surfaces.

The design parameters of an ophthalmic lens according to the invention are: the series of bands of the prescribed dioptric power, the width if the bands, the position of the bands (on front surface (14) or rear surface (12) or both), the dioptric power of the series of bands, the lens thickness and the index of refraction of the lens material. In the specification, the elliptical cross-section bands could also have an eccentricity equal to zero, thus including within the definition of an ellipse, the circle as an ellipse of eccentricity equal to zero.

Figure 5:
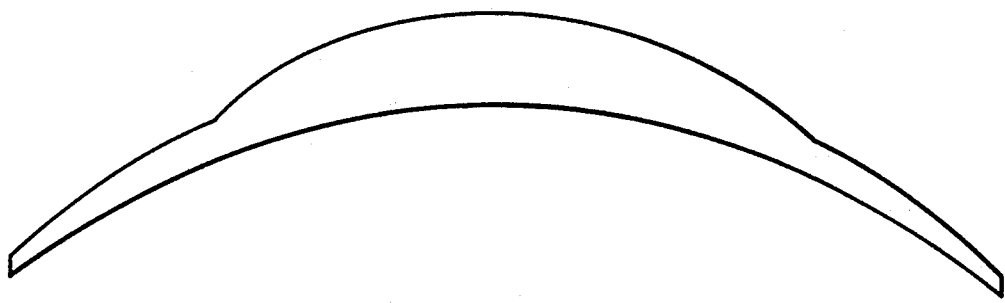
FIG. 5 shows a cross-section of a lenticulated converging lens having the same refractive power as the lens in FIG. 3 as well as the same overall diameter. The reduction of thickness is achieved through lenticulation.
Figure 6:
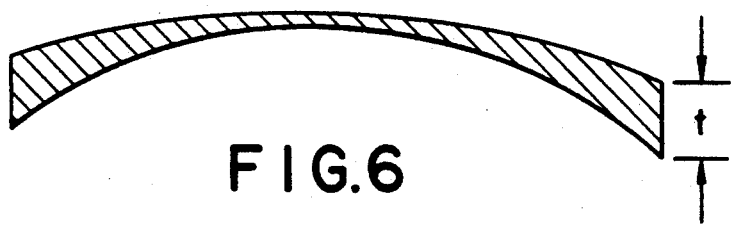
FIGS. 6, 7 and 8 correspond to FIGS. 3, 4 and 5, for the case of a diverging (negative) lens.
Figure 7:
Figure 8:
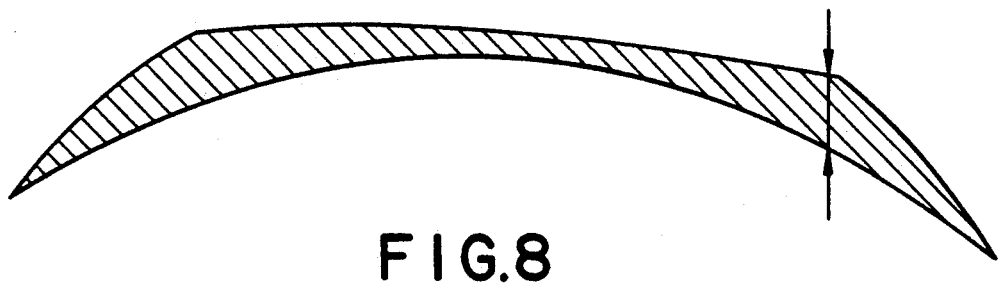

In the preferred embodiment shown in FIG. 5 rear surface (12) has a circular cross-section. Of course, the difference between the respective dioptric power of the series of circular bands on the surface (14) and of surface (12) defines the dioptric power of the lens through the respective series of circular bands.

Essentially, once the above mentioned parameters of series of bands, the width of the bands, the dioptric power of the bands, and the index of refraction of the lens material are chosen, the remaining parameters to be determined are the parameters of the ellipse which is to be fit between adjacent bands such that the elliptical cross-sections of the bands are joined at intersection points so that a continuous surface (14) of the lens is obtained.

In the preferred embodiment, the dioptric power of surface (12) is constant and therefore the series of bands has its own predetermined dioptric power. Although there are an infinite number of ellipses of revolution having a given dioptric power, the member of the family of ellipses having the appropriate dioptric power which has the smallest eccentricity while still fitting between adjacent bands on the lens is chosen.

Figure 2:
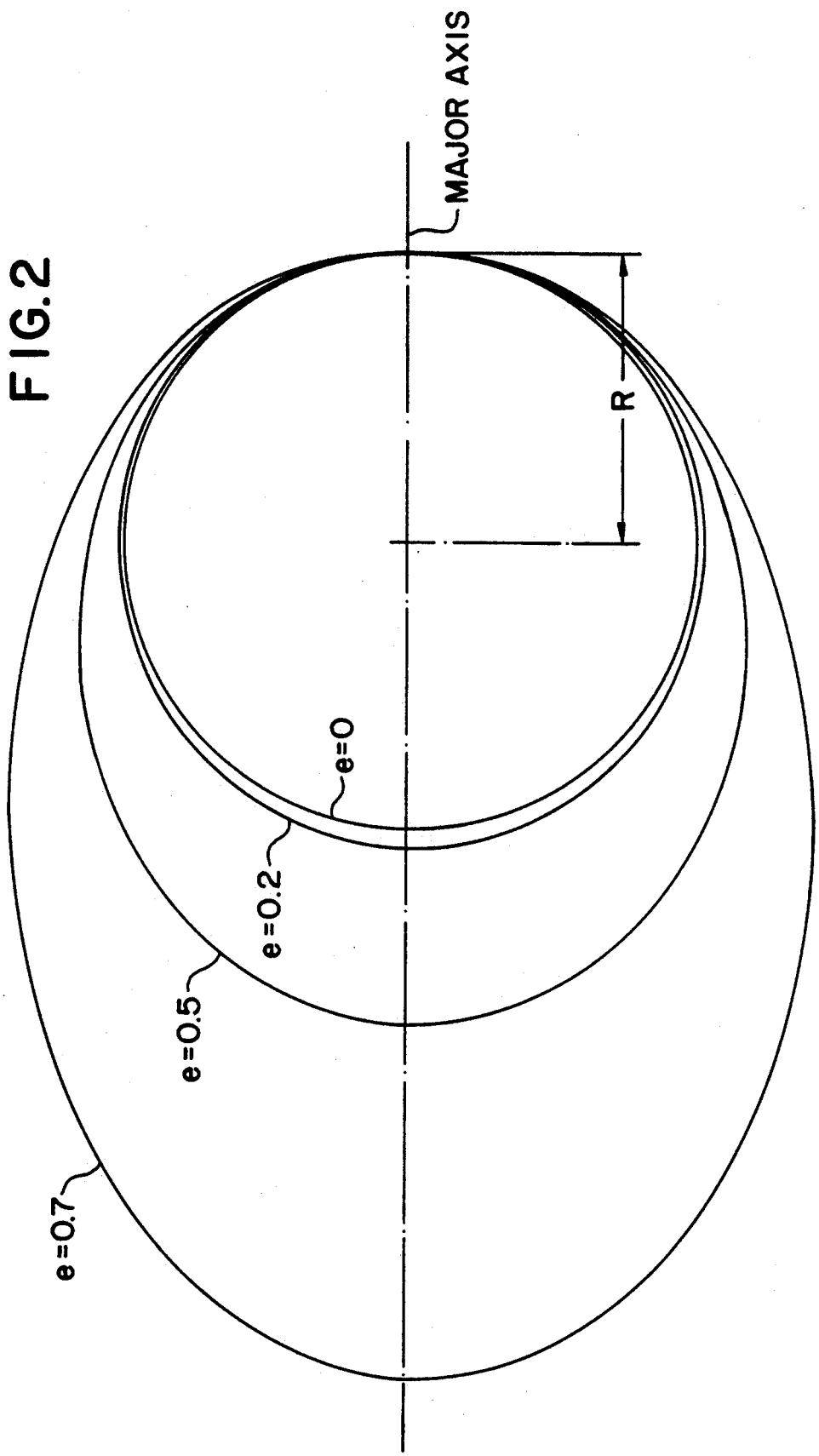
FIG. 2 shows some members of a family of ellipses having the same radius of curvature at their vertex.
Figure 3:
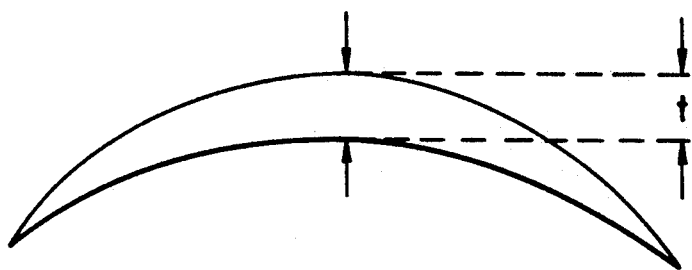
FIG. 3 shows schematically a cross-section of a converging (positive) lens. Thickness reaches its maximum at the center of the lens.
Figure 4:
FIG. 4 shows a cross-section of a converging lens having the same refractive power as the lens in FIG. 3, but of a smaller diameter. The decrease in diameter permits a reduction in central thickness.

FIG. 2 shows four exemplary members of a family of ellipses having the same radius of curvature, R at their vertex. The eccentricities shown are 0 (circle of radius R), 0.2, 0.5 and 0.7.

Thus, the elliptical curves of the series of bands may be chosen by choosing the intersection points of the cross-section of the bands, and then fitting an ellipse having its axis extending from the optical axis to the lens at an angle such that a portion of the ellipse near the vertex extends between the two intersection points of the adjacent bands. Of course the determination of a suitable eccentricity and the rest of the parameters of the elliptical cross-section forming a given band is achieved mathematically (instead of geometrical construction).

The viewing portion of such a lens produced according to the present invention, i.e. the optical zone, is a centrally located circular area which is of sufficient size to cover the pupil in dilated state, taking into account the lens movement due to blink cycle as well as due to lateral and vertical eye movement. The actual size of the optical zone will be within practical limits well known to those skilled in the art. The optical zone may be surrounded by one or several peripheral zones having the usual lens functions.

It is pointed out that in accordance with the principal object of the invention, the reduction in the thickness of the lens profile is made possible due to the minimal sagittal height (depth) of the elliptical cross-section bands, the above mentioned sagittal height extending from the base joining two adjacent bands to the vertex of the defining ellipse.

As seen from Tables 1, 2, 3, 4, the progressive increase in thickness with the increase in dioptric power of a lens manifests itself in both converging and diverging types of contact lenses.

It must be kept in mind that a contact lens is interpreted as a foreign object as far as eye/eyelid system is concerned and a lens of increased thickness will obviously present an elevated level of discomfort.

More importantly, the permeability to gas and in consequence the rate of gas transport across the lens decreases rapidly with the increase in lens thickness. The adverse effects of decreased gas exchange are well documented in relevant literature.

Needless to say that a lens of a substantially reduced thickness will present numerous optical and clinical advantages.

TABLE 1

Typical Parameters of a Lenticulated Converging (Positive) Contact Lens Fabricated from a Rigid Gas-Permeable Material.

| | |
|---|---|
| Refractive index of the material | n' = 1.435 |
| posterior radius | 7.80 mm |
| overall diameter | 9.60 mm |
| optical zone diameter | 8.00 mm |
| junction thickness | 0.16 mm |
| Dioptric power in D (Diopters) | Central thickness in mm |
| +3.00 D | 0.23 mm |
| +6.00 D | 0.30 mm |
| +9.00 D | 0.37 mm |
| +12.00 D | 0.45 mm |
| +18.00 D | 0.62 mm |

TABLE 2

Typical Parameters of a Lenticulated Diverging (Negative) Contact Lens Fabricated from a Rigid Gas-Permeable Material

| | |
|---|---|
| Refractive index | n' = 1.435 |
| posterior radius | 7.80 mm |
| overall diameter | 9.60 mm |
| optical zone diameter | 8.00 mm |
| central thickness | 0.13 mm |
| Dioptric power (in Diopters) | Junction thickness in mm |
| −3.00 D | 0.20 mm |
| −6.00 D | 0.27 mm |
| −9.00 D | 0.34 mm |
| −12.00 D | 0.40 mm |
| −18.00 D | 0.52 mm |

TABLE 3

Typical Parameters of a Converging (Positive) Soft Contact Lens

| | |
|---|---|
| Water content | 55% |
| Refractive index (hydrated) | n' = 1.41 |
| posterior radius | 8.60 mm |
| Overall diameter | 14.00 mm |
| optical zone diameter | 8.00 mm |
| junction thickness | 0.18 mm |
| Dioptic power in Diopters | Central thickness in mm |
| +3.00 D | 0.25 mm |
| +6.00 D | 0.32 mm |
| +9.00 D | 0.39 mm |
| +12.00 D | 0.47 mm |
| +18.00 D | 0.64 mm |

TABLE 4

Typical Parameters of a Diverging (Negative) Soft Contact Lens

| | |
|---|---|
| water content | 55% |
| Refractive index (hydrated) | n' = 1.41 |
| posterior radius | 8.60 mm |
| Overall diameter | 14.00 mm |
| optical zone diameter | 8.00 mm |
| central thickness | 0.06 mm |
| Dioptric power In diopters | Junction thickness in mm |

TABLE 4-continued

| Typical Parameters of a Diverging (Negative) Soft Contact Lens | |
| --- | --- |
| −3.00 D | 0.13 mm |
| −6.00 D | 0.20 mm |
| −9.00 D | 0.26 mm |
| −12.00 D | 0.33 mm |
| −18.00 D | 0.45 mm |

Table (5) provides typical values for sagittal heights of the elliptical cross-section bands having bandwidth of clinically practical dimensions. The table is given to illustrate the object of the invention and in no way to restrict the range of the parameters of possible lenses.

For comparison, Col 2 of Table (5) provides thickness values for a lens constructed according to typical traditional lenticulation methods.

TABLE 5

| Refractive index of lens material | | | $n' = 1.435$ |
| --- | --- | --- | --- |
| posterior radius | | | 7.80 mm |
| overall diameter | | | 9.60 mm |
| optical zone diameter | | | 8.00 mm |
| junction thickness | | | 0.16 mm |
| (1) Lens dioptric power in D | (2) central thickness lenticulated | (3) sag depth for in mm bandwidth 1.00 mm | (4) carrier (function) 0.12 mm total lens thickness in mm |
| +3.00 | 0.23 mm | 0.0168 mm | 0.1368 |
| +6.00 | 0.30 mm | 0.0177 mm | 0.1377 |
| +9.00 | 0.37 mm | 0.0185 mm | 0.1385 |
| +12.00 | 0.45 mm | 0.0194 mm | 0.1394 |
| +18.00 | 0.62 mm | 0.0211 mm | 0.1411 |

It is pointed out that the widths of the elliptical cross-section bands is selected according to the clinical requirements and in practical terms the possible range will permit a substantial reduction in the thickness of the lens profile and consequently the thickness of the lens. The advantages of a minimum profile lens are numerous and are well known to those skilled in the art; better fitting characteristics, increased comfort and a substantial increase in gas-exchange are important immediate ones.

Manufacturing a contact lens according to the present invention presents no problems considering the advent of sophisticated computer controlled lathes capable of describing almost any solid of revolution. Thus, a lens may be lathe cut. It is also possible to manufacture molds or dies and either mold or cast such a lens. Conversely, a combination of methods may be employed, where a base curve is cast and front surface lathe cut or the reverse may be the case. In other words, there are many possibilities for manufacturing such a lens.

What is claimed is:

1. An ophthalmic lens having front and rear optical surfaces and a central optical axis substantially perpendicular to the lens, the lens comprising:
a plurality of concentric, contiguous circular refractive bands provided on at least one of said front and rear optical surfaces, the bands each having a continuous cross-section in the shape of a segment of an ellipse having given major and minor axis lengths and eccentricity, the bands being of a given optical power to focus light on a focal plane, an axis of each said segment of an ellipse intersecting the central optical axis and the focal plane, said bands being continuous at their boundaries between neighboring ones of said bands.

2. The lens according to claim 1, wherein said bands are provided on said front optical surface, and wherein said rear optical surface is spheroid.

3. The lens according to claim 2, wherein the eccentricity of the spheroid rear optical surface is zero, whereby said rear optical surface is spherical.

* * * * *